US008903797B2

(12) United States Patent
Lagerblad et al.

(10) Patent No.: US 8,903,797 B2
(45) Date of Patent: Dec. 2, 2014

(54) SYSTEM AND METHOD FOR LOADING OBJECTS FOR OBJECT-RELATIONAL MAPPING

(75) Inventors: Bo Jonas Lagerblad, Palo Alto, CA (US); Asquith A. Bailey, Palo Alto, CA (US); Arun L. Katkere, Los Gatos, CA (US); Sitaram Krishnamurthy Iyer, Sunnyvale, CA (US)

(73) Assignee: TIBCO Software Inc., Palo Alto, CA (US)

( * ) Notice: Subject to any disclaimer, the term of this patent is extended or adjusted under 35 U.S.C. 154(b) by 120 days.

(21) Appl. No.: 13/452,654

(22) Filed: Apr. 20, 2012

(65) Prior Publication Data
US 2013/0282751 A1    Oct. 24, 2013

(51) Int. Cl.
*G06F 17/30* (2006.01)
(52) U.S. Cl.
USPC .......................................... 707/706; 707/769
(58) Field of Classification Search
USPC ................................. 707/706, 769
See application file for complete search history.

(56) References Cited

U.S. PATENT DOCUMENTS

| 5,615,362 | A  | * | 3/1997 | Jensen et al. | 1/1 |
|---|---|---|---|---|---|
| 6,078,926 | A  | * | 6/2000 | Jensen et al. | 1/1 |
| 7,174,327 | B2 | * | 2/2007 | Chau et al. | 1/1 |
| 7,668,737 | B2 | * | 2/2010 | Streepy, Jr. | 705/3 |
| 7,668,806 | B2 | * | 2/2010 | Liu et al. | 707/769 |
| 7,797,304 | B2 | * | 9/2010 | Muralidhar et al. | 707/713 |
| 7,873,611 | B2 | * | 1/2011 | Ebersole | 707/701 |
| 7,895,241 | B2 | * | 2/2011 | Schoen et al. | 707/802 |
| 7,930,288 | B2 | * | 4/2011 | Delgado et al. | 707/707 |
| 8,046,376 | B2 | * | 10/2011 | Seitz et al. | 707/769 |

* cited by examiner

*Primary Examiner* — Kim Nguyen
(74) *Attorney, Agent, or Firm* — Baker & McKenzie LLP

(57) ABSTRACT

Disclosed are systems and methods for creating data objects, which includes querying a database to locate a first table associated with a first data type to be created, loading a plurality of rows from the first table during the query associated with the first table, creating a first set of data objects associated with the first data type, wherein each data object of the first set is created from data stored in each of the rows loaded from the first table. The systems and methods also include querying the database to locate a second data type to be created, wherein the second data type depends from the first data type, wherein the data objects of the second set depend from the data objects of the first set, and associating each data object of the second set to an associated parent object of the first set.

21 Claims, 4 Drawing Sheets

SYSTEM AND METHOD FOR LOADING OBJECTS FOR OBJECT-RELATIONAL MAPPING

TECHNICAL FIELD

This disclosure generally relates to object-relational mapping and, more particularly, relates to using type based object loading to load a large number of objects for object-relational mapping in which the objects have a deep hierarchy.

BACKGROUND

Typical object-relational mapping is very resource intensive and requires many database queries to perform object-relational mapping. The time and resources required to perform object-relational mapping increases even more when objects stored in a database have a class dependency from other objects. Typically, the database will need to be queried once for all objects of the parent class object, and once for each object of the dependent class, and once for each object that may further depend from one of these classes. If a high number of objects have dependent relationships with a high number of other objects, it may take an unreasonable amount of time and resources to separately query each object and dependent objects from the one or more databases. The need has arisen to provide a mechanism for using type based object loading for object-relational mapping to greatly reduce the queries made on a database, especially when several objects have dependent relationships with other objects to be loaded.

SUMMARY

Disclosed are embodiments of systems and methods for creating data objects, which includes querying a database to locate a first table associated with a first data type to be created, loading a plurality of rows from the first table during the query associated with the first table, creating a first set of data objects associated with the first data type, wherein each data object of the first set is created from data stored in each of the rows loaded from the first table. The systems and methods also include querying the database to locate a second table associated with a second data type to be created, wherein the second data type depends from the first data type, loading a plurality of rows from the second table during the query associated with the second table, creating a second set of data objects associated with the second data type, wherein each data object of the second set is created from data stored in each of the rows loaded from the second table, wherein the data objects of the second set depend from the data objects of the first set, and associating each data object of the second set to an associated parent object of the first set.

Also disclosed are embodiments of systems and methods for querying the database to locate a third table associated with a third data type to be created, wherein the third data type depends from the second data type, loading a plurality of rows from the third table during the query associated with the third table, creating a third set of data objects associated with the third data type, wherein each data object of the third set is created from data stored in each of the rows loaded from the third table, wherein the data objects of the third set depend from the data objects of the second set, and associating each data object of the third set to an associated parent object of the second set.

Also disclosed are embodiments of systems and methods for querying a database where a table may have a plurality of columns, such that each column may be associated with one or more different data types. Thus, in some embodiments, three different data types may be loaded from the result of one query to a database table that stores the three different data types in separate columns, and the systems and methods may associate relationships between each of these three data types after they have been loaded, such that additional queries of the database are not needed. Data loading may be done in an optimized breadth first loading instead of depth first loading, which reduces the number of round trips to the database by a factor of the number of objects in the model to a factor of the depth of the model. By eliminating all usage of "lazy" loading and loading collections of contained classes, the disclosed embodiments load all entities that have a common base class with one database query. In some embodiments, the instances may be connected to form the same object graph. In some embodiments, the type-based loading software or logic may be generated from type mapping metadata provided by the object relational manager layer or by inspecting the database and using its stored table relationships.

Also disclosed are embodiments of systems and methods for creating data objects by loading subsets of the stored objects based on one or more parameters. In some embodiments, a data object may be associated with a name, and a search parameter can include the name of the data objects to partially load, such that not all of the objects of the database associated with a particular object or class have to be loaded, which results in several efficiencies.

In some embodiments, the complete data model is read into memory, which is updated and persisted from different threads. In some embodiments, an on-demand populated cache with shorter life span may be used by dashboards to request smaller subsets of data. In some embodiments, a mixed mode of loading may be used, which uses knowledge of the persisted data to load all instances of objects having relatively few instances, and performing on-demand loading of children to these objects.

The present disclosure provides several important technical advantages. In certain embodiments, the present disclosure provides mechanisms for providing a high degree of efficiency to reduce the number of queries made to a database for object-relational mapping by using type based loading to load up objects having dependent relationships with other objects. Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

Embodiments are illustrated by way of example in the accompanying figures, in which like reference numbers indicate similar parts, and in which.

DETAILED DESCRIPTION

Figure 1:
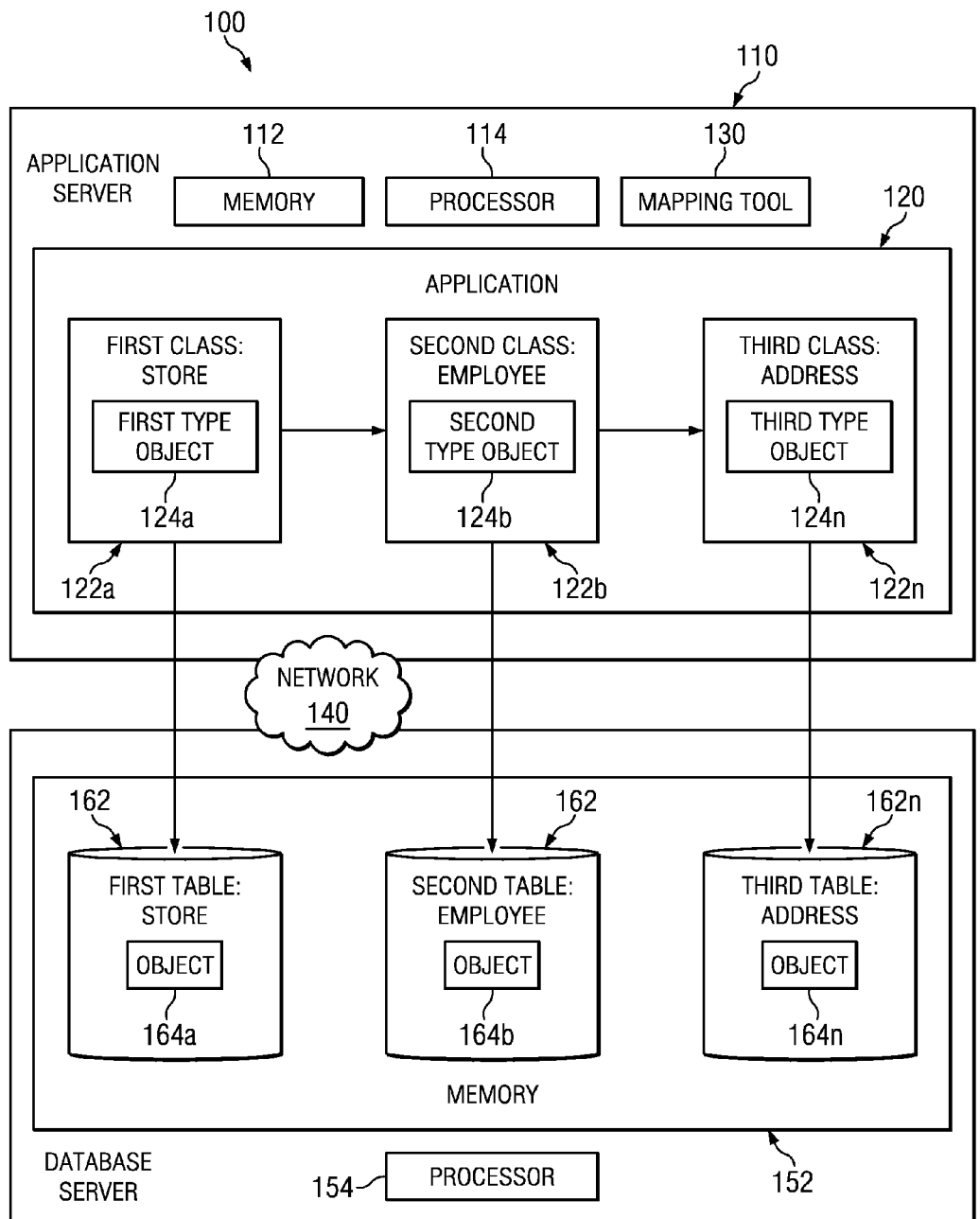
FIG. 1 is a schematic diagram illustrating an example system for using type based loading for loading objects in object-relational mapping, in accordance with the present disclosure.

FIG. 1 is a schematic diagram illustrating an example system 100 for using type based loading for loading objects in object-relational mapping, in accordance with the present disclosure. According to the illustrated embodiment, system 100 may include an application server 120 comprising a memory 112, a processor 114, an application 120 having one or more classes 122, and a mapping tool 130. Mapping tool 130 may communicate with database server 150 via network 140. Database server 150 may include a memory 152 and a processor 154. In the illustrated example, memory 152 may store objects 164 organized by tables 162. Mapping tool 130 may efficiently query database server 150 to load objects 164 and convert the objects 164 to data that may be compatible with the particular programming language associated with application 122 running on application server 110. Though not illustrated, queries may include one or more parameters and refer to any type of request that may be processed to locate and retrieve one or more values or objects stored on database server 150.

Application server 110 may represent a general or special-purpose computer capable of performing the described operations. For example, application server 110 may include, but are not limited to, mobile devices; cell phones; laptop computers; desktop computers; end user devices; video monitors; cameras; personal digital assistants (PDAs); or any other communication hardware, software, and/or encoded logic that supports the communication of queries, texts, or other suitable forms of data. Remote servers 110 may include any appropriate combination of hardware, software, memory, and/or encoded logic suitable to perform the described functionality. Application server 110 may comprise one or more machines, workstations, laptops, blade servers, server farms, and/or stand-alone servers. Application server 110 may be operable to communicate with any node or component in system 100 in any suitable manner. System 100 may comprise any appropriate number and type of application servers 110. Although the embodiment illustrated in FIG. 1 illustrates that application server 110 may be external to database server 150, application server 110 may be integral or directly connected to database server 150.

Memory 112 may comprise any collection and arrangement of volatile and/or non-volatile components suitable for storing data and objects. For example, memory 112 may comprise random access memory (RAM) devices, read only memory (ROM) devices, magnetic storage devices, shared memory, optical storage devices, and/or any other suitable data storage devices. In particular embodiments, memory 112 may represent, in part, computer-readable storage media on which computer instructions and/or logic are encoded. Although shown in FIG. 1 as a single component, memory 112 may represent any number of memory components within, local to, and/or accessible by processor 114. Although shown in FIG. 1 as internal to application server 120, memory 112 may be external application server 120. In some embodiments, memory 112 may include one or more databases, such that each database may have one or more tables, and each table may have one or more rows, and each row may have one or more values. In some embodiments, memory 112 may store the same or similar objects that are mapped from database server 150 and store these mapped objects using the same or similar database schema and structure as objects 164 are stored in database server 150. Database schema in a relational database may define tables, fields, relationships (e.g., dependent relationships), views, indexes, packages, procedures, functions, queues, triggers, sequences, etc.

Processor 114 may represent and/or include any form of processing component, including general purpose computers, dedicated microprocessors, or other processing devices capable of processing electronic information. Examples of processor 114 include digital signal processors (DSPs), application-specific integrated circuits (ASICs), field-programmable gate arrays (FPGAs), and any other suitable specific or general purpose processors. Although FIG. 1 illustrates a single processor 114 in application server 110, application server 110 may include any suitable number of processors 114.

Application 120 may represent any appropriate combination of logic and/or software to perform tasks. For example, application 120 may be any programming language (e.g., C++, C#, Java, .NET, Object Pascal, Perl, PHP, Python, Ruby, Visual Basic, etc.). Examples of applications 120, include, but are not limited to enterprise software, accounting software, office software, graphics software, and media players. Programming language of application 120 may be organized into one or more functions or sub-tasks or classes 122 that process particular data types 124 to perform a particular task or achieve a desired result. For example, application 120 may include one or more functions associated with classes 122a-122n that may process one or more data object types 124a-124n to achieve the desired results for performing a particular task.

Each data type object 124 may be of a certain type, and include one or more values or one or more other data objects. In some embodiments, an instance of a data type object may refer to a row of a table stored in a database. Examples of data type objects 124 may include, but are not limited to, values (e.g., numeric, text, dates, etc.), pointers, videos, images, web pages, etc. In some embodiments, classes 122 and type objects 124 may have a dependent relationship with one or more other classes 122 and type objects 124 within application 120. For example, a function in a first class 122a may utilize a first type object 124a, such that the first type object 124a may be a container for a second type object 124b that may be utilized by a function in the first 122a or second class 122b, and the second type object 124b may be a container for a third type object 124n that may be utilized by a function in the first class 122a, second class 122b, or third classes 122n. Thus, when a first type parent object 124a is called by a first class 122a, its second child type object 124b must also be called, along with the third child type object 124n to the second type object, which typically results in loading three data type objects 124 from memory 112. In the illustrated example, application 120 may perform tasks associated with a store (or store type object 124a representing an address and/or name of a store) having one or more employees (or one or more employee type objects 124b representing a name of employee for a particular store it depends from) and each employee (or employee type object 124b) may have one or more addresses (or address type objects 124n representing address of a particular employee it depends from). Thus, the address class 122n and its associated address type objects 124n may depend from the employee class 122b and its associated employee type objects 124b, which may depend from the store class 122a and its associated store type objects 124b.

Mapping tool 130 represents any appropriate combination of hardware, memory, logic, and/or software suitable to perform the described functions. Mapping tool 130 may utilize object-relational mapping to convert data between incompatible data types associated with different programming languages (e.g., C++, C#, Java, .NET, Object Pascal, Perl, PHP, Python, Ruby, Visual Basic, etc.). For example, data objects 164 stored on database server 150 that are utilized for an application 120 written in C++ may not be properly linked or may be incompatible for use in another application 120 written in Java, or another programming language. Thus, mapping tool 103 may translate the logical representation of objects 164 stored in database server 150 into a form that is properly linked and capable of being read and processed by the particular programming language associated with application 120, while preserving the database schema and properties of objects 164 and their relationships to one another. Thus, mapping tool 130 may query database server 150 to retrieve the desired objects 164 and the database schema associated with the objects 164, and ensure that the loaded objects 124 are properly mapped to a particular application 120 based on the logic and/or programming language associated with the particular application 120. In some embodiments, mapping tool 130 may create a virtual object database in memory 112 that may be used by a particular application 120. For example, if an application 120 is written in several different programming languages, mapping tool 130 may be able to create separate mappings to the desired objects while preserving the database schema for each separate programming language associated with an application 120. In some embodiments, mapping tool 130 may create a mapping between data type objects 124 associated with a particular application 120 associated with a particular programming language without duplicating the objects 164 already stored on database server 150. In some embodiments, mapping tool 130 may load objects 164 from database server 150, while preserving the database schema, and create separate databases of the objects 164 for each particular programming language associated with an application 120. The objects mapped by mapping tool may ultimately be stored on application server 120 or database server 150.

Network 140 may represent any form of communication network supporting circuit-switched, packet-based, and/or any other suitable type of communications between application server 110, database server 150, and any other elements illustrated in FIG. 1. Network 140 may additionally include any other nodes of system 100 capable of transmitting and/or receiving information over a communication network. Although shown in FIG. 1 as a single element, network 140 may represent one or more separate networks (including all or parts of various different networks) that are separated and serve different respective elements illustrated in FIG. 1. Network 140 may include routers, hubs, switches, firewalls, content switches, gateways, call controllers, and/or any other suitable components in any suitable form or arrangement. Network 140 may include, in whole or in part, one or more secured and/or encrypted Virtual Private Networks (VPNs) operable to couple one or more network elements together by operating or communicating over elements of a public or external communication network. In general, network 140 may comprise any combination of public or private communication equipment such as elements of the public switched telephone network (PSTN), a global computer network such as the Internet, a local area network (LAN), a wide area network (WAN), or other appropriate communication equipment. In some embodiments, application server 110 and database server 150 may exist on the same machine, which may obviate the need for any network communications.

Database server 150 represents any appropriate combination of hardware, memory, logic, and/or software suitable to perform the described functions. For example, database server 150 may be any suitable computing device comprising a processor and a memory. Database server 150 may comprise one or more machines, workstations, laptops, blade servers, server farms, and/or stand-alone servers. Database server 150 may be operable to communicate with any node or component in system 100 in any suitable manner. Database server 150 may use one or more types of database schema or programming languages to organize data objects 162 into one or more tables 162. For example, a database schema in a relational database may define tables, fields, relationships (e.g., dependent relationships), views, indexes, packages, procedures, functions, queues, triggers, sequences, etc. In the illustrated example, a particular table 162 may store one or more rows of data objects 164 associated with particular data types 124 used by a particular class 122 in application 120.

Memory 152 may comprise any collection and arrangement of volatile and/or non-volatile components suitable for storing one or more databases having tables 162 and objects 164. For example, memory 112 may comprise random access memory (RAM) devices, read only memory (ROM) devices, magnetic storage devices, shared memory, optical storage devices, and/or any other suitable data storage devices. In particular embodiments, memory 152 may represent, in part, computer-readable storage media on which computer instructions and/or logic are encoded. Although shown in FIG. 1 as a single component, memory 152 may represent any number of memory components within, local to, and/or accessible by processor 154. Although shown in FIG. 1 as internal to database server 150, memory 152 may be external to database server 150. In some embodiments, memory 152 may include one or more databases, such that each database may have one or more tables, and each table may have one or more rows, and each row may have one or more values. Data and objects 164 may be stored in memory 152 using database schema to define tables, fields, relationships (e.g., dependent relationships), views, indexes, packages, procedures, functions, queues, triggers, sequences, etc.

Processor 154 may represent and/or include any form of processing component, including general purpose computers, dedicated microprocessors, or other processing devices capable of processing electronic information. Examples of processor 154 include digital signal processors (DSPs), application-specific integrated circuits (ASICs), field-programmable gate arrays (FPGAs), and any other suitable specific or general purpose processors. Although FIG. 1 illustrates a single processor 154 in database server 150, database server 150 may include any suitable number of processors 154.

Data loading may be done in an optimized breadth first loading instead of depth first loading, which reduces the number of round trips to the database by a factor of the number of objects in the model to a factor of the depth of the model. By eliminating all usage of "lazy" loading and loading collections of contained classes, the disclosed embodiments load all entities that have a common base class with one database query. In some embodiments, the instances may be connected to form the same object graph. In some embodiments, the type-based loading software or logic may be generated from type mapping metadata provided by the object relational manager layer or by inspecting the database and using its stored table relationships.

Also disclosed are embodiments of systems and methods for creating data objects by loading subsets of the stored objects based on one or more parameters. In some embodiments, a data object may be associated with a name, and a search parameter can include the name of the data objects to partially load, such that not all of the objects of the database associated with a particular object or class have to be loaded, which results in several efficiencies.

In some embodiments, the complete data model is read into memory, which is updated and persisted from different threads. In some embodiments, an on-demand populated cache with shorter life span may be used by dashboards to request smaller subsets of data. In some embodiments, a mixed mode of loading may be used, which uses knowledge of the persisted data to load all instances of objects having relatively few instances, and performing on-demand loading of children to these objects.

Figure 2:
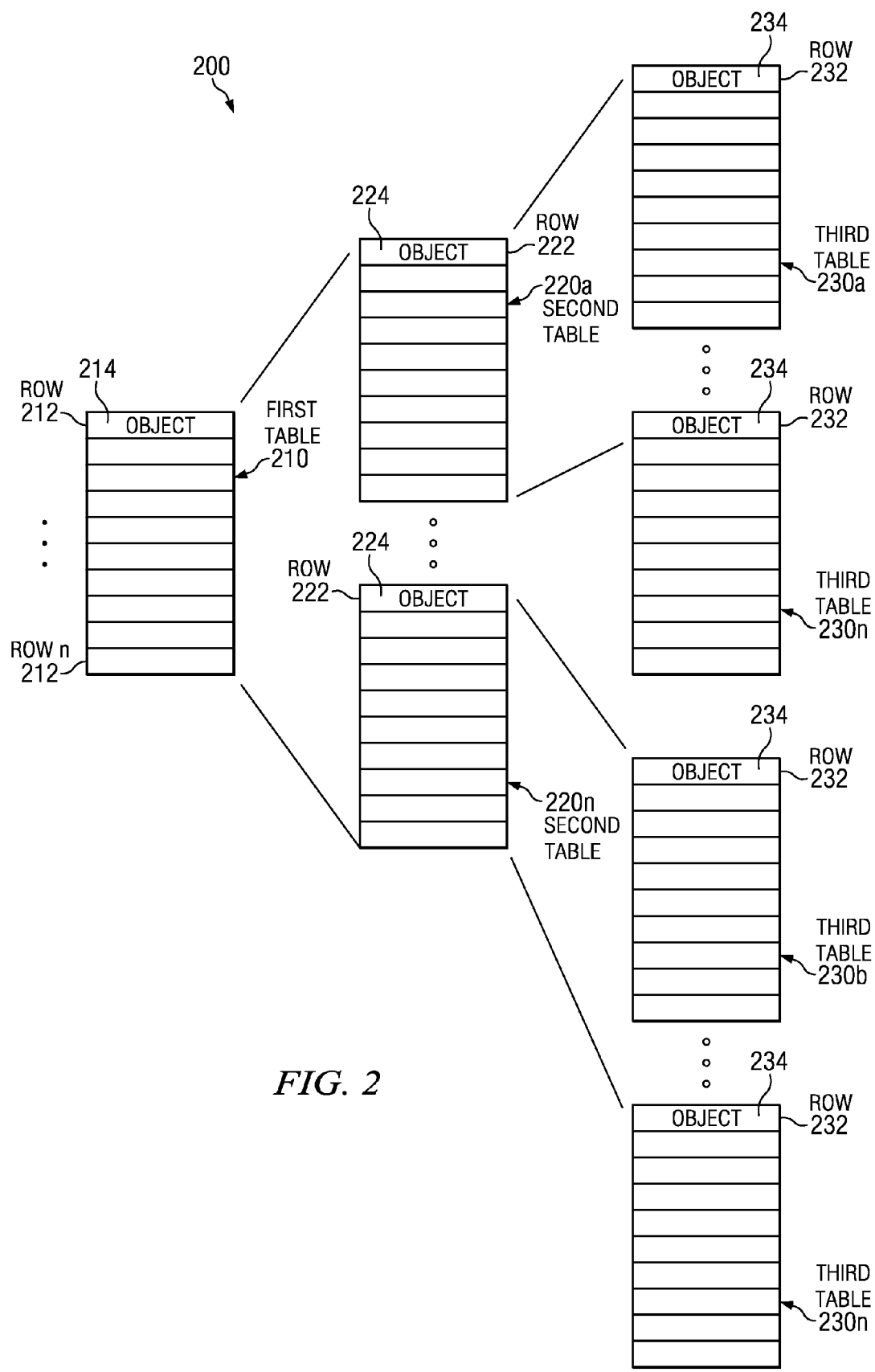
FIG. 2 is a schematic diagram illustrating example tables storing objects having dependent relationships with other objects, in accordance with the present disclosure.

FIG. 2 is a schematic diagram illustrating example tables storing objects having dependent relationships with other objects, in accordance with the present disclosure. In the illustrated example, a first object 214 stored on a first row 212 of a first table 210 that may be associated with a first particular data type (e.g., stores). The first object 214 of the first row 212 may be linked via pointers or any other suitable mechanism to one or more object types 224 stored in one or more rows 222 of a second table 220 that may be associated with a second particular data type (e.g., employees). The first object 224 of the first row 222 of the second table 220 may be linked via pointers or any other suitable mechanism to one or more object types 234 stored in one or more rows 232 of a third table 230 that may be associated with a third particular data type (e.g., addresses). In the illustrated example, each object or each table may serve as a node that can link to one or more other objects and tables in a tree-like structure. Although FIG. 2 illustrates that the objects may have a depth of three nodes with a parent node having one or more child node-leaves, which may also have one or more child node-leaves, any suitable number of leaves and depths of objects may be utilized. Though not illustrated in FIG. 2, one table may have a plurality of columns, such that each column may be associated with one or more different data types. Thus, in some embodiments, three different data types may be loaded from the result of one query to a database table that stores the three different data types in separate columns, and the systems and methods may associate relationships between each of these three data types after they have been loaded, such that additional queries of the database are not needed.

Figure 3:
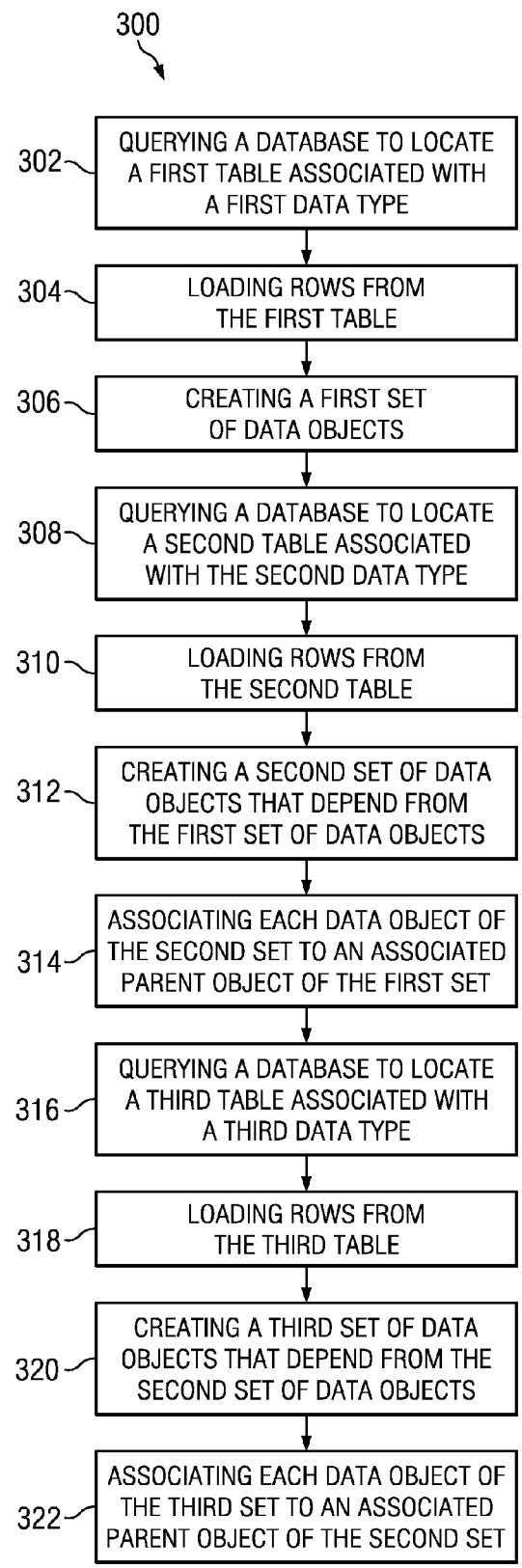
FIG. 3 is a flow diagram illustrating a process for using type based loading for loading objects in object-relational mapping.

FIG. 3 is a flow diagram illustrating a process for using type based loading for loading objects in object-relational mapping. In the illustrated example, flow diagram 300 begins at step 302 where mapping tool 130 (or application server 120) queries a database 150 to locate a first table 162 associated with a first data type to be created. At step 304, mapping tool 130 loads a plurality of rows from the first table 162 during the query associated with the first table 162. At step 306, mapping tool 130 creates a first set of data objects associated with the first data type, wherein each data object of the first set may be created from data objects stored in each of the rows loaded from the first table 162.

At step 308, mapping tool 130 queries the database 150 to locate a second table 162 associated with a second data type to be created, wherein the second data type depends from the first data type. At step 310, mapping tool 130 loads a plurality of rows from the second table 162 during the query associated with the second table. At step 312, mapping tool 130 creates a second set of data objects associated with the second data type, wherein each data object of the second set may be created from data stored in each of the rows loaded from the second table 162, wherein the data objects of the second set depend from the data objects of the first set. At step 314, mapping tool 130 may associate each data object of the second set to an associated parent object of the first set.

At step 316, mapping tool 130 queries the database 150 to locate a third table 162 associated with a third data type to be created, wherein the third data type depends from the second data type. At step 318, mapping tool loads a plurality of rows from the third table 162 during the query associated with the third table 162. At step 320, mapping tool 130 creates a third set of data objects associated with the third data type, wherein each data object of the third set may be created from data stored in each of the rows loaded from the third table 162, wherein the data objects of the third set depend from the data objects of the second set. At step 322, mapping tool 130 may associate each data object of the third set to an associated parent object of the second set. Thus, mapping tool 130 may create or map the database structure associated with the first data object by querying the database 150 once for each level of depth (e.g., three queries in the illustrated example). Typically, object relational mapping tools have to query the database for each of the child nodes, which could result in thousands or millions of queries to create or map a particular database.

Figure 4:
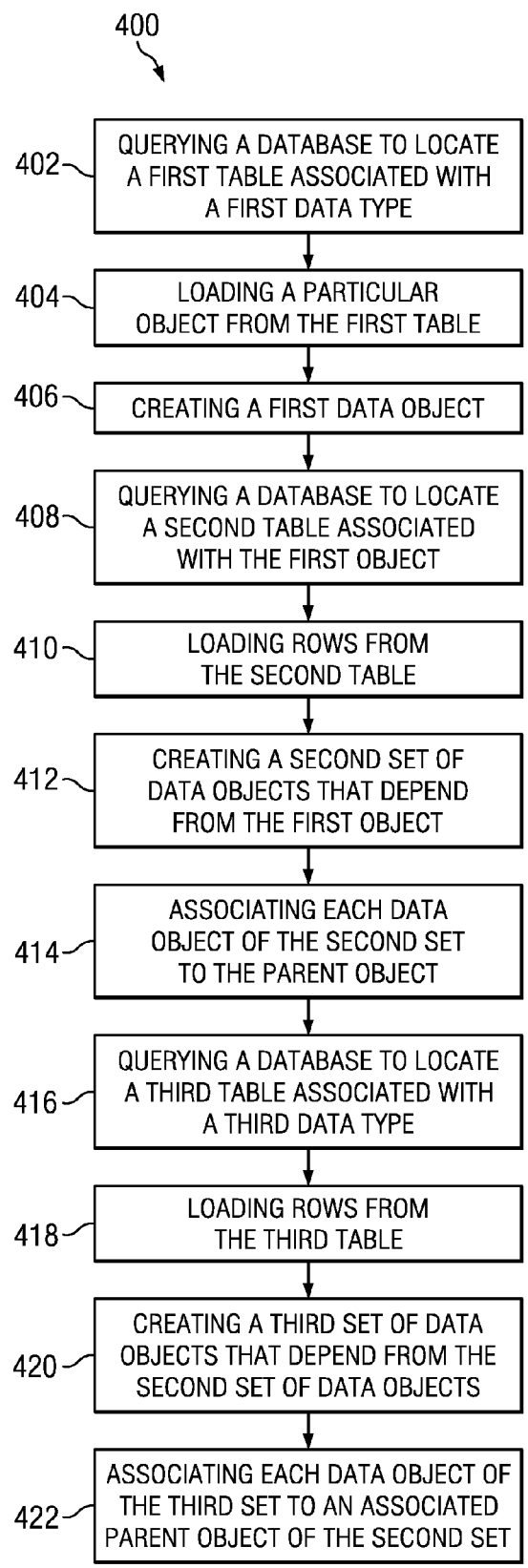
FIG. 4 is a flow diagram illustrating a process for using type based loading for partial object loading in object-relational mapping.

FIG. 4 is a flow diagram illustrating a process for using type based loading for partial object loading in object-relational mapping in which one parent object and its dependent objects can be loaded, rather than loading all of the objects. In the illustrated example, flow diagram 400 begins at step 402 where mapping tool 130 (or application server 120) queries a database 150 to locate a first table 162 associated with a first data type to be created. At step 404, mapping tool 130 loads a particular row from the first table 162 during the query associated with the first table 162, such that the particular row may be associated with a particular object to be processed (e.g., a particular store, rather than all stores). At step 406, mapping tool 130 creates a first data object associated with the first data type, wherein the data object may be created from the data object stored in the row loaded from the first table 162.

At step 408, mapping tool 130 queries the database 150 to locate a second table 162 associated with a second data type to be created, wherein the second data type depends from the first data object. At step 410, mapping tool 130 loads a plurality of rows from the second table 162 during the query associated with the second table. At step 412, mapping tool 130 creates a second set of data objects associated with the second data type, wherein each data object of the second set may be created from data stored in each of the rows loaded from the second table 162, wherein the data objects of the second set depend from the data object of the first data type. At step 414, mapping tool 130 may associate each data object of the second set to the parent object of the first data type.

At step 416, mapping tool 130 queries the database 150 to locate a third table 162 associated with a third data type to be created, wherein the third data type depends from the second data type. At step 418, mapping tool loads a plurality of rows from the third table 162 during the query associated with the third table 162. At step 420, mapping tool 130 creates a third set of data objects associated with the third data type, wherein each data object of the third set may be created from data stored in each of the rows loaded from the third table 162, wherein the data objects of the third set depend from the data objects of the second set. At step 422, mapping tool 130 may associate each data object of the third set to an associated parent object of the second set. Thus, mapping tool 130 may create or map the database structure associated with the first data object by querying the database 150 once for each level of depth (e.g., three queries in the illustrated example). Typically, object relational mapping tools have to query the database for each of the child nodes, which could result in thousands or millions of queries to create or map a particular database.

Thus, the steps in FIG. 4 may be used to create data objects by loading subsets of the stored objects based on one or more parameters. In some embodiments, a data object may be associated with a name, and a search parameter can include the name of the data objects to partially load, such that not all of the objects of the database associated with a particular object or class have to be loaded, which results in several efficiencies.

While various embodiments have been described above, it should be understood that they have been presented by way of example only, and not limitation. Thus, the breadth and scope of a preferred embodiment should not be limited by any of the above described exemplary embodiments, but should be defined only in accordance with the claims and their equivalents for any patent that issues claiming priority from the present provisional patent application.

For example, as referred to herein, a machine or engine may be a virtual machine, computer, node, instance, host, or machine in a networked computing environment. Also as referred to herein, a networked computing environment is a collection of machines connected by communication channels that facilitate communications between machines and allow for machines to share resources. Network may also refer to a communication medium between processes on the same machine. Also as referred to herein, a server is a machine deployed to execute a program operating as a socket listener and may include software instances.

Resources may encompass any types of resources for running instances including hardware (such as servers, clients, mainframe computers, networks, network storage, data sources, memory, central processing unit time, scientific instruments, and other computing devices), as well as software, software licenses, available network services, and other non-hardware resources, or a combination thereof.

A networked computing environment may include, but is not limited to, computing grid systems, distributed computing environments, cloud computing environment, etc. Such networked computing environments include hardware and software infrastructures configured to form a virtual organization comprised of multiple resources which may be in geographically disperse locations.

Various terms used herein have special meanings within the present technical field. Whether a particular term should be construed as such a "term of art," depends on the context in which that term is used. "Connected to," "in communication with," or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context. Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A method for creating data objects, the method comprising:
    performing a first query of a database to locate a first table associated with a first data type to be created;
    loading a plurality of rows from only the first table during the query associated with the first table;
    creating a first set of data objects associated with the first data type, wherein each data object of the first set is created from only data stored in each of the rows loaded from the first table;
    performing a second query of the database to locate a second table associated with a second data type to be created, wherein the second data type depends from the first data type;
    loading a plurality of rows from only the second table during the query associated with the second table;
    creating a second set of data objects associated with the second data type, wherein each data object of the second set is created from only data stored in each of the rows loaded from the second table, wherein the data objects of the second set depend from the data objects of the first set; and
    associating each data object of the second set to an associated parent object of the first set,
    wherein the database is queried only once for the first table and the database is queried only once for the second table.

2. The method of claim 1, wherein the method further comprises:
    querying the database to locate a third table associated with a third data type to be created, wherein the third data type depends from the second data type;
    loading a plurality of rows from the third table during the query associated with the third table;
    creating a third set of data objects associated with the third data type, wherein each data object of the third set is created from data stored in each of the rows loaded from the third table, wherein the data objects of the third set depend from the data objects of the second set; and
    associating each data object of the third set to an associated parent object of the second set.

3. The method of claim 2, wherein the three sets of objects having a dependent relationship with one another are created based on three queries to the database.

4. The method of claim 1, wherein the two sets of objects having a dependent relationship with one another are created based on two queries to the database.

5. The method of claim 1, wherein the first table and the second table are the same table.

6. The method of claim 1, wherein a portion of the database having the second table is located on a different machine than another portion of the database having the first table.

7. The method of claim 1, wherein the data objects are associated with classes of an object oriented programming language.

8. A system for creating data objects, the system comprising:
   a machine comprising a processor, wherein the machine is operable to:
      perform a first query of a database to locate a first table associated with a first data type to be created;
      load a plurality of rows from only the first table during the query associated with the first table;
      create a first set of data objects associated with the first data type, wherein each data object of the first set is created from only data stored in each of the rows loaded from the first table;
      perform a second query of the database to locate a second table associated with a second data type to be created, wherein the second data type depends from the first data type;
      load a plurality of rows from only the second table during the query associated with the second table;
      create a second set of data objects associated with the second data type, wherein each data object of the second set is created from only data stored in each of the rows loaded from the second table, wherein the data objects of the second set depend from the data objects of the first set; and
      associate each data object of the second set to an associated parent object of the first set,
      wherein the database is queried only once for the first table and the database is queried only once for the second table.

9. The system of claim 8, wherein the machine is further operable to:
   query the database to locate a third table associated with a third data type to be created, wherein the third data type depends from the second data type;
   load a plurality of rows from the third table during the query associated with the third table;
   create a third set of data objects associated with the third data type, wherein each data object of the third set is created from data stored in each of the rows loaded from the third table, wherein the data objects of the third set depend from the data objects of the second set; and
   associate each data object of the third set to an associated parent object of the second set.

10. The system of claim 8, wherein the three sets of objects having a dependent relationship with one another are created based on three queries to the database.

11. The system of claim 8, wherein the two sets of objects having a dependent relationship with one another are created based on two queries to the database.

12. The system of claim 8, wherein the first table and the second table are the same table.

13. The system of claim 8, wherein a portion of the database having the second table is located on a different machine than another portion of the database having the first table.

14. The system of claim 8, wherein the data objects are associated with classes of an object oriented programming language.

15. Logic for creating data objects, the logic being embodied in a non-transitory computer-readable medium and when executed operable to:
   performing a first query of a database to locate a first table associated with a first data type to be created;
   load a plurality of rows from only the first table during the query associated with the first table;
   create a first set of data objects associated with the first data type, wherein each data object of the first set is created from only data stored in each of the rows loaded from the first table;
   performing a second query of the database to locate a second table associated with a second data type to be created, wherein the second data type depends from the first data type;
   load a plurality of rows from only the second table during the query associated with the second table;
   create a second set of data objects associated with the second data type, wherein each data object of the second set is created only from data stored in each of the rows loaded from the second table, wherein the data objects of the second set depend from the data objects of the first set; and
   associate each data object of the second set to an associated parent object of the first set,
   wherein the database is queried only once for the first table and the database is queried only once for the second table.

16. The logic of claim 15, wherein the logic is further operable to:
   query the database to locate a third table associated with a third data type to be created, wherein the third data type depends from the second data type;
   load a plurality of rows from the third table during the query associated with the third table;
   create a third set of data objects associated with the third data type, wherein each data object of the third set is created from data stored in each of the rows loaded from the third table, wherein the data objects of the third set depend from the data objects of the second set; and
   associate each data object of the third set to an associated parent object of the second set.

17. The logic of claim 15, wherein the three sets of objects having a dependent relationship with one another are created based on three queries to the database.

18. The logic of claim 15, wherein the two sets of objects having a dependent relationship with one another are created based on two queries to the database.

19. The logic of claim 15, wherein the first table and the second table are the same table.

20. The logic of claim 15, wherein a portion of the database having the second table is located on a different machine than another portion of the database having the first table.

21. The logic of claim 15, wherein the data objects are associated with classes of an object oriented programming language.

* * * * *